United States Patent Office 3,262,524
Patented July 26, 1966

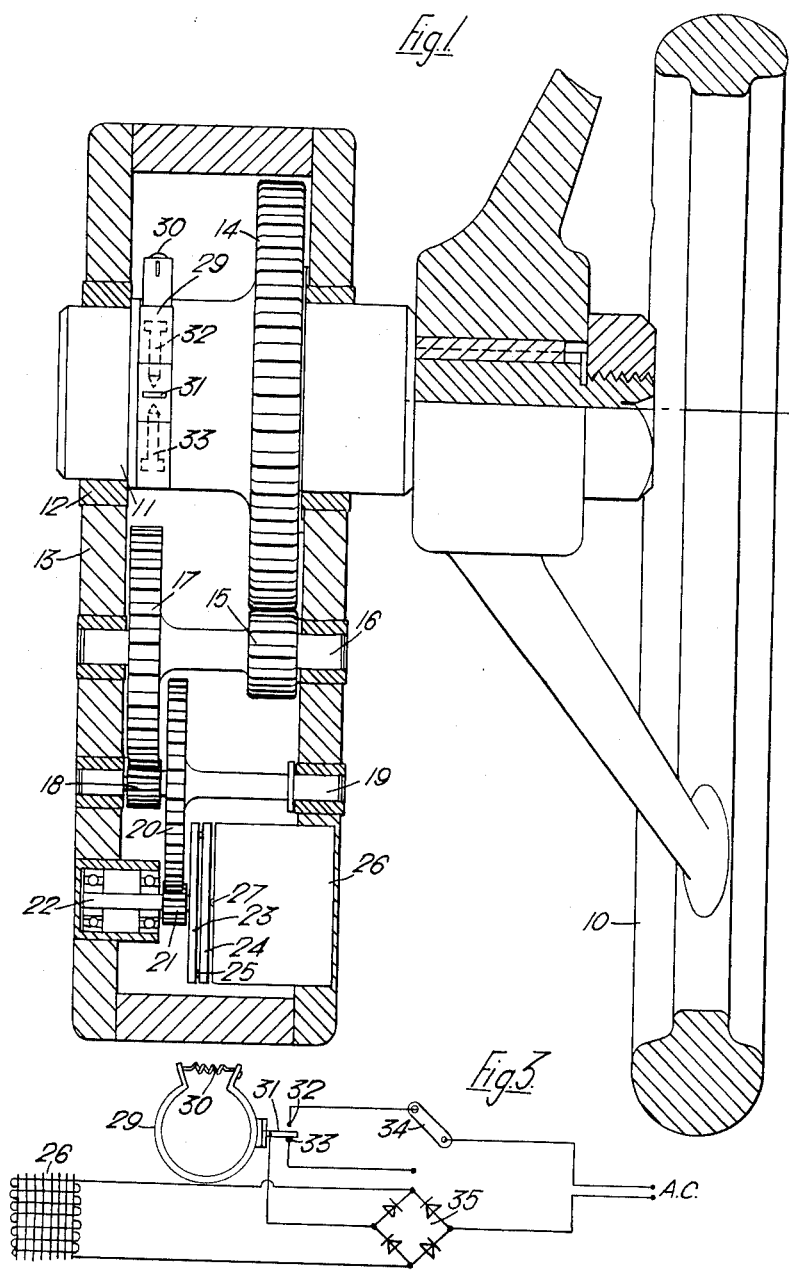

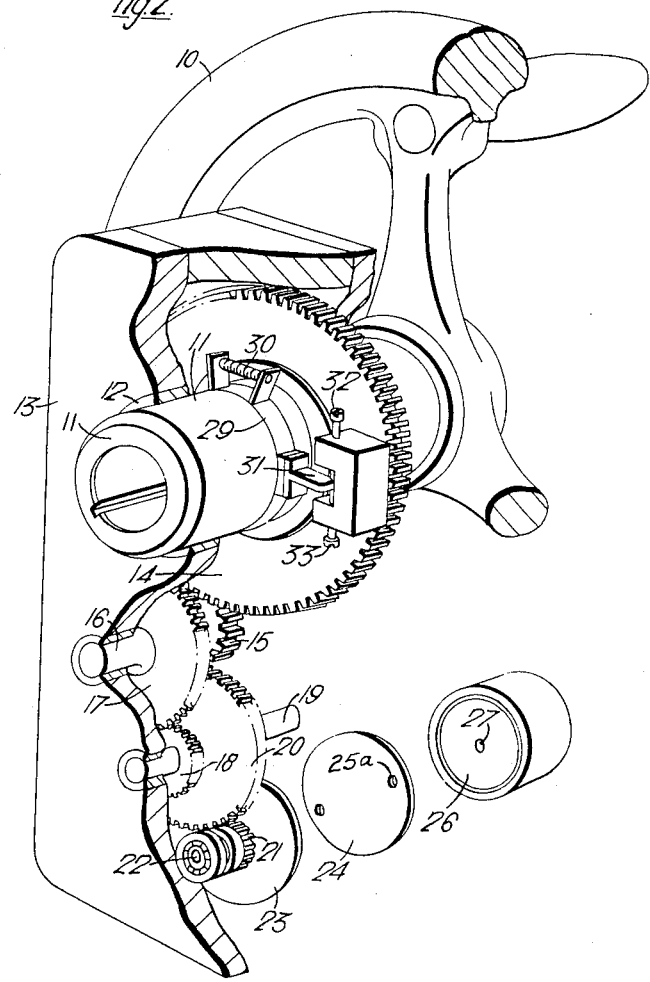

3,262,524
ONE WAY ELECTRIC TRANSMISSION BRAKE
Arthur Kinder Haslehurst, Derby, England, assignor to Paramatic Development Limited, Derby, England
Filed Dec. 4, 1963, Ser. No. 328,040
6 Claims. (Cl. 192—9)

This invention relates to electro-magnetic brake mechanisms for use in connection with machine tool control systems, and chiefly in connection with manually operated machine tool control systems.

In connection with this class of equipment considerable difficulty has been experienced in devising a brake mechanism which to all intents and purposes is instantaneous in its operation, that is to say, which brings progress to a halt immediately on being operated. In connection with machine tools in which the tool progress is manually controlled it is important that the breaking action shall be immediate, since a very slight delay affects the accuracy of the work. Delays in existing electro-magnetic braking systems are usually caused by the need for moving parts in the brake mechanism itself to take up altered positions in order to apply the braking force. Moreover it is essentially that these moving parts shall be of fairly heavy construction if the required braking torque is considerable. In addition, considerable electrical power is normally required, which in turn demands the introduction of substantial relays between the controlling signal or impulse which is intended to initiate the braking operation and the brake itself. These are liable to increase further the delay in the braking action.

The object of this invention is to provide an electromagnetic brake mechanism appropriate for the purposes referred to, and which will be more immediate in its action, while at the same time being relatively simple and straightforward in its construction and operation.

According to the present invention a relatively slow-moving control member operates a rotor at a relatively high speed through the medium of a high ratio gear train, and the rotor is arranged to be attracted and brought to rest by the energisation of an electro-magnet, which thereupon exerts an immediate and magnified braking effect through the gear train on the control member.

Preferably the slow-moving control member is in the form of a wheel mounted on a shaft, which also carries the first member of the gear train, and the final member of the gear train is mounted on another shaft which also carries a disc mounted in close proximity to the electro magnet.

The electro magnet is conveniently energised by a current triggered by an impulse or signal originating in the control system at the appropriate moment, so that the slight gap or clearance between the magnet and the disc is closed and the disc is brought to rest, whereupon the power exerted by the magnet is mechanically increased through the gear train and felt immediately on the shaft which carries the hand wheel.

In this application of the braking effect to the hand wheel shaft there will be no backlash in the gears, since all backlash will have been previously taken up by the driving action of the gear train.

A constructional form of the invention will now be described in more detail with reference to the accompanying drawings in which:

FIGURE 1 is a sectional side elevation of a brake mechanism.

FIGURE 2 is an exploded perspective view of the electro magnet and gear assembly.

FIGURE 3 is an electrical circuit diagram suitable for alternating current operation.

A hand wheel 10 is mounted on shaft 11 carried in bearings 12 in a frame or housing 13, and on the shaft there is also mounted a toothed gear wheel 14. This gear wheel 14 is the driving member of a gear train of high ratio of increase, for instance of the order of 1:80. The gear train comprises a pinion 15 fixed on a shaft 16 on which is also fixed a gear wheel 17 which drives a second pinion 18 fixed on a shaft 19 on which is fixed a further gear wheel 20 which drives a pinion 21 fixed on a shaft 22 on which is also fixed a plate 23. The several shafts are all mounted parallel with each other in the frame or housing 13. The pinion 21 and shaft 22 are therefore driven at a relatively high speed in relation to the shaft 11 and gear wheel 14. A disc 24 of soft iron or other suitable material is mounted on the shaft 22; it is free to move axially along the shaft but it is restrained from rotation relative to the shaft by means of pegs or dogs 25 on the plate 23 which fit in holes 25a on the disc 24, or by means of splines on the shaft as preferred. The disc 24 fits almost flush with the face of a pot-type electro magnet 26. The soft iron disc is normally urged away from the magnet by a spring-loaded ball 27 set in the centre pole of the magnet.

On the current being triggered by an electrical impulse the electro magnet attracts the disc 24, overcoming the action of the spring-loaded ball 27, and the clearance between the disc 24 and the magnet 26 is eliminated. The final shaft 22 is now no longer free to rotate. The gear train therefore operates in the reverse way to increase the braking action on the hand wheel shaft 11, which is therefore at once locked immovably. Around the shaft 11 is a friction band 29 loaded by a spring 30.

An insulated contact 31 is attached to the band 29 between two fixed insulated contacts 32, 33 in close proximity. The action of turning the shaft in either direction causes the band 29 to move until arrested by one of the fixed contacts 32, 33, thereby closing a circuit as shown in FIGURE 3 which is arranged to apply the current to the magnet 26. The slightest motion then in the opposite direction by the wheel 10 causes the opening of the contacts. Either of the fixed contacts 32, 33 may be selectively brought into circuit with the electro magnetic brake by a switch 34 to cause arrest of motion in one direction only. Free backward movement may then be obtained even after the brake circuit has functioned, as the back-lash in the gear train may be arranged to be adequate for the small movement required to break the circuit between the aforementioned contacts 31 and either 32 or 33. Where the brake is operated by an alternating current a rectifier bridge 35 is included in the brake housing as shown in the circuit diagram. It should be apparent from the above that when the control wheel begins to rotate the brake will automatically be applied against rotation in one direction. The switch 34 pre-selec's one of the fixed contacts 32, 33, namely the contact which is appropriate to the direction selected. Thus the brake will operate to prevent rotation in the desired direction, leaving the apparatus quite free to rotate in the opposite direction. The current will not reach the brake coils however if the contact 31 is not engaging one or other of the contacts 32, 33. Upon cessation of rotation in the opposite direction and upon starting to turn in said one selected direction, the contact 31 will immediately engage the appropriate fixed contact and apply the brake.

I claim:

1. An electromagnetic brake comprising a relatively slowly rotatable driving member for turning in either of opposite directions, a high ratio gear train connected to the driving member, a rotor driven at a relatively high speed by the gear train and movable for a short distance along on its own axis, a stationary electromagnet adjacent said rotor for attracting and stopping said rotor, and direction sensing means associated with said rotatable driving member operable to energize said electromagnet upon cessation of rotation of the driving member in one direction and immediately upon start of rotation in the opposite direction, whereby said gear train is in driving engagement to effect an immediate and magnified braking effect on the driving member through friction of the gear train without back lash.

2. An electromagnetic brake mechanism comprising a relatively slowly rotatable control member for turning in either of opposite directions, a high ratio gear train connected to the control member, an axially slideable rotor driven at a relatively high speed by the gear train, a stationary electromagnet mounted adjacent said rotor for attracting and stopping the rotor, and electric circuit means including switching elements operated by said control member to energize said magnet upon cessation of rotation of the control member in one direction and slight motion in the opposite direction whereby to exert an immediate and magnified braking effect through the gear train on the control member without back lash.

3. An electromagnetic brake mechanism comprising a housing, a control shaft mounted in the housing, a gear wheel mounted on the shaft, a gear train driven by the gear wheel, a final member in the gear train, a final shaft mounted in the housing having the final member of the gear train fixed to it, a disc mounted on the final shaft to rotate therewith and slideable therealong, an electro magnet having a fixed attraction face mounted in close proximity to the disc, and electric circuit means including switching elements operated by said control shaft and connected to the electromagnet to energize the electromagnet to attract the disc to said face and bring the final shaft immediately to rest upon cessation of rotation of the control shaft in one direction and slight movement in the opposite direction, the braking action applied to the final shaft being immediately transmitted through and without backlash to said control shaft amplified by friction of the gear train which is in driving engagement.

4. An electromagnetic brake mechanism as claimed in claim 3 including means acting to urge the disc away from the magnet until the magnet is energized.

5. An electromagnetic brake mechanism comprising a first shaft and a final shaft, a gear train connecting the first shaft to the final shaft, said gear train being so organized that the first shaft drives the final shaft at a relatively high speed, an electromagnet associated with the final shaft, means secured to the final shaft and attractable by the electromagnet to stop the gear train when the electromagnet is energized, said gear train thereupon acting to bring the first shaft immediately to rest, a friction band applied to said first shaft, an electrical contact attached to the band, two fixed contacts mounted in close proximity to the band contact, one at each side thereof, said contacts being so arranged that turning of the shaft moves the band to engage said electrical contact with one one of the fixed contacts, and an electric energizing means including means for completing a circuit to said electromagnet through said one fixed contact whereby to energize the electro magnet and brake the first shaft immediately upon turning in one direction but freeing the first shaft to turn in the opposite direction.

6. An electromagnetic brake mechanism as claimed in claim 5 wherein said means for completing a circuit includes a switch selectively movable to engage either one of said two fixed contacts whereby to enable selection of the direction of rotation of said first shaft in which the electromagnet will be energized to immediately brake said first shaft.

References Cited by the Examiner

UNITED STATES PATENTS

| | | | |
|---|---|---|---|
| 748,488 | 12/1903 | Eastwood | 192—9 X |
| 1,963,638 | 6/1934 | Wilsing | 192—18.2 X |
| 2,401,003 | 5/1946 | Lear | 192—9 X |
| 2,962,139 | 11/1960 | Straub | 192—18.2 X |
| 3,117,659 | 1/1964 | Selset | 192—4 |

FOREIGN PATENTS 920,422  11/1954  Germany.

DAVID J. WILLIAMOWSKY, *Primary Examiner.*

DON A. WAITE, *Examiner.*

B. W. WYCHE III, *Assistant Examiner.*